United States Patent

[11] 3,628,135

[72] Inventor William Charles Reed
 Whitley Bay, England
[21] Appl. No. 877,922
[22] Filed Dec. 15, 1969
[45] Patented Dec. 14, 1971
[73] Assignee The Rank Organisation Limited
 London, England
[32] Priority Apr. 29, 1966
[33] Great Britain
[31] 18,955/66
 Continuation of application Ser. No.
 633,901, Apr. 26, 1967, now abandoned.
 This application Dec. 15, 1969, Ser. No.
 877,922

[54] CRANKED HOLLOW WAVEGUIDE FOR MEASURING MOISTURE CONTENT OF MOVING SHEET OR WEB MATERIAL
 11 Claims, 7 Drawing Figs.
[52] U.S. Cl. .................................................. 324/58.5 A
[51] Int. Cl. ....................................................... G01n 27/04

[50] Field of Search............................................ 324/58, 58.5

[56] References Cited
 UNITED STATES PATENTS
 2,457,695 12/1948 Liskow ......................... 324/58.5 A X
 3,066,254 4/1962 Price et al. ..................... 324/37
 3,079,551 2/1963 Walker .......................... 324/58 A X
 3,136,946 6/1964 Levine .......................... 324/58.5 A Primary Examiner—Edward E. Kubasiewicz
Attorney—Jacobs & Jacobs ABSTRACT: The invention is concerned with the measurement of moisture content by microwave transmission through a sheet or web of material and the specification discloses a split form of waveguide to embrace the sheet, the waveguide having a cranked configuration portion at one or both ends allowing the edge regions of the sheet to be excluded from the measurement region. The split portions of the waveguide are displaceable away from each other to allow an obstruction to pass between them.

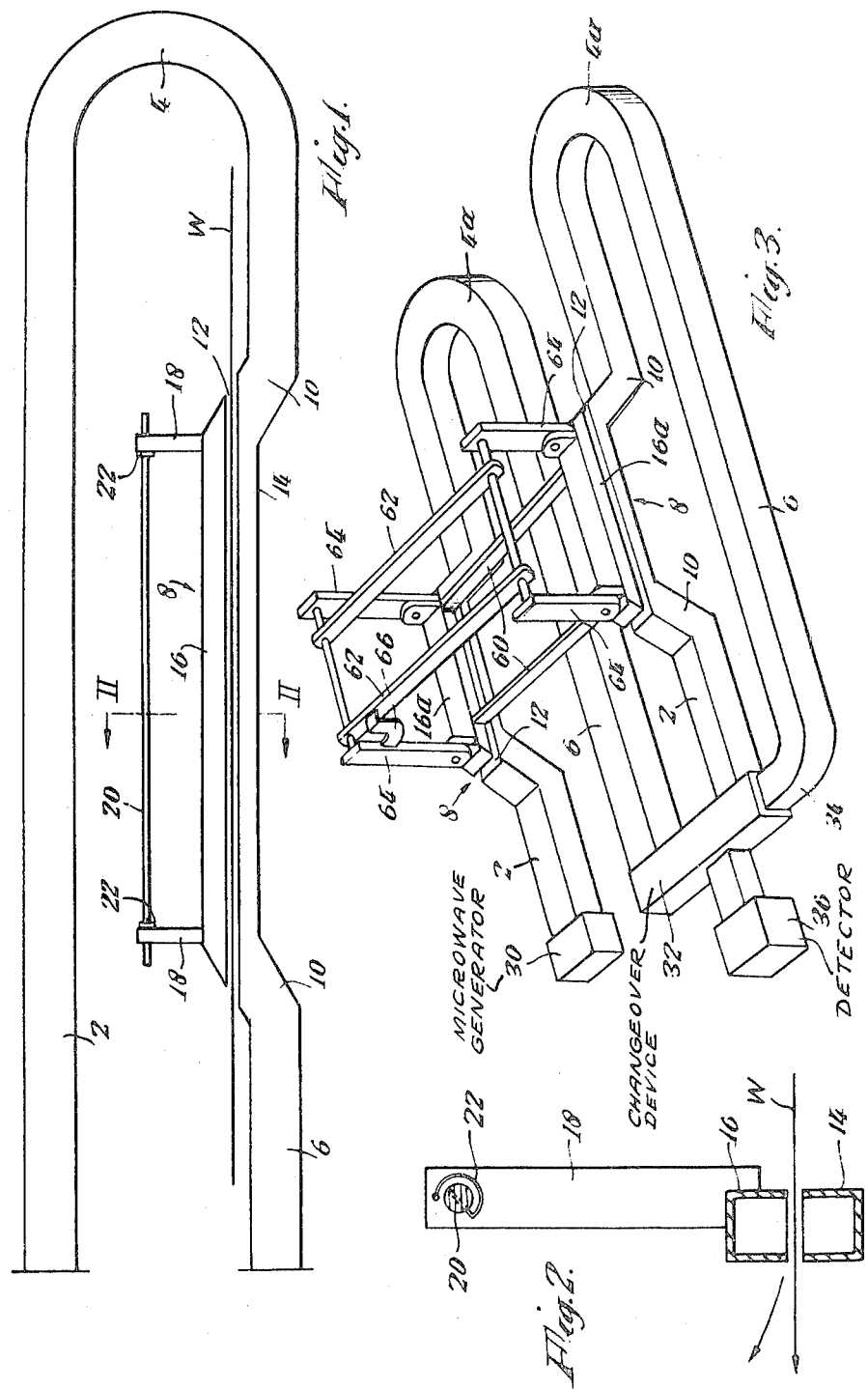

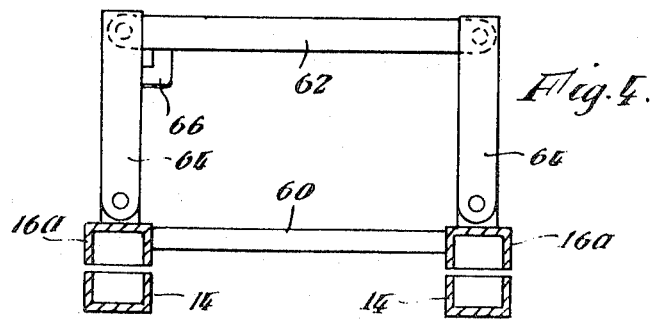
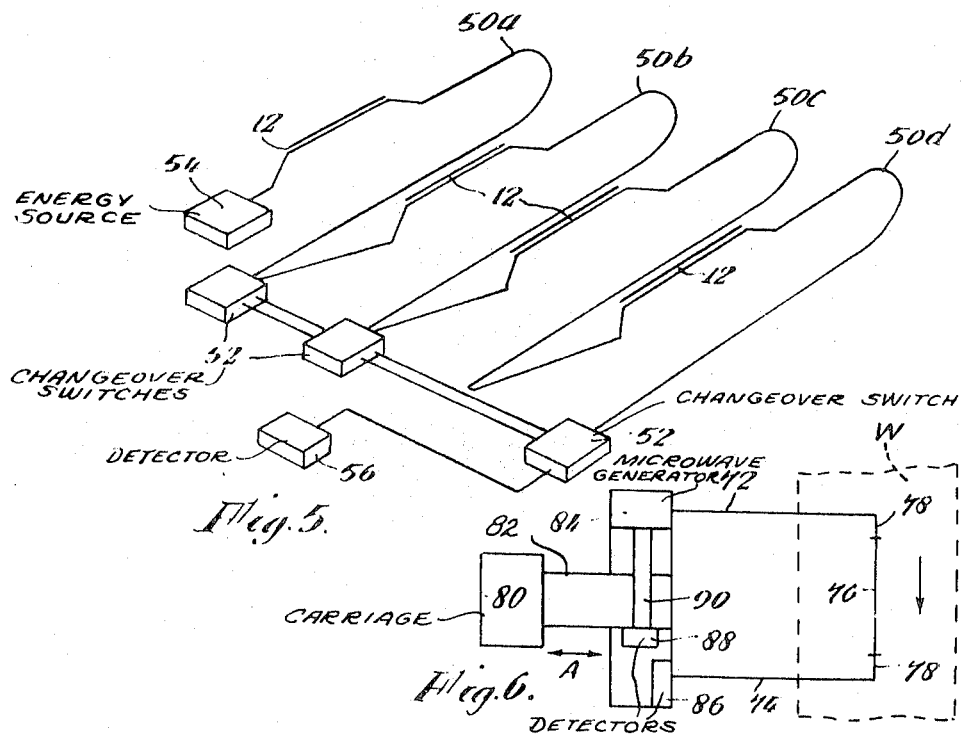
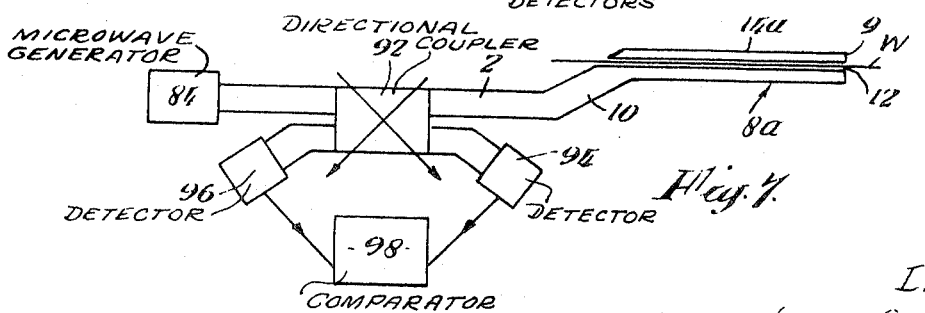

CRANKED HOLLOW WAVEGUIDE FOR MEASURING MOISTURE CONTENT OF MOVING SHEET OR WEB MATERIAL

This application is a continuation of my earlier application Ser. No. 633,901, filed Apr. 26, 1967, now abandoned.

This invention relates to the measurement of moisture in sheet or web materials. It is well known that moisture will attenuate microwaves propagated through waveguides if such moisture is present within the guide. Proposals have already been made for measuring the amount of moisture in sheet material by passing the material through slots formed in opposed walls of a hollow waveguide, the plane of the slots being parallel to the E-plane of the microwaves passing through the waveguide. By comparing the strength of the electromagnetic field at points in the waveguide before and after the slot the attenuation resulting from a sheet of material passing through the waveguide by way of the slots can be measured, and the degree of moisture in the material can thus be calculated.

In previous constructions for measuring moisture in this way the slot is defined between two opposite channel-shaped portions of a straight rectangular waveguide, one such portion being movable away from the other portion to open the waveguide so that a sheet or web may be introduced thereto. The removable portion of the waveguide can then be replaced so that the sheet lies in the slot formed between the two opposed portions The removable portion may be hinged at one end to a fixed part of the waveguide, or may be freely and completely removable from the remainder of the waveguide. Apparatus as described has the disadvantage that some time is taken in opening the waveguide, placing the sheet or web in position and closing the waveguide before measurements can be made. Furthermore, it is difficult to position a moving sheet through the slots so that if a continuous sheet manufacturing or treating process is being performed it may be necessary to interrupt this when measurements need to be taken.

A further difficulty with such apparatus is the necessity of ensuring good electrical contact between the removable portion of the waveguide and the parts of the waveguide at each longitudinal end of the removable portion or alternatively of having to use electrical matching means, such as quarter-wave choke transformer sections, at each end of the removable portion to ensure uniform propagation of microwaves along the waveguide when the removable portion is in position. This obviously increases cost and production difficulties.

According to the present invention a hollow waveguide for use in the measurement of the moisture content of a sheet or web of material is formed with a main position extending from a connecting portion, the axes of said portions being mutually angularly offset, the waveguide being divided by a slot extending along the length of the main portion and through the adjacent region of the connecting portion, said connecting portion projecting to one side of the plane of the slot, that part of the waveguide to the other side of said plane being displaceably mounted to permit passage through the slot of an obstruction or joint in the sheet or web, or of a thicker material.

The arrangement is adapted for the measurement of moisture content in textile materials having seams or joins between different grades of materials, and also in textile materials in or emerging from a tentering machine which may operate upon a variety of weights and widths of fabric. The invention is further applicable to the measurement of moisture content in a continuous web in a papermaking machine, since the apparatus recited can be arranged to take a reading over a strip of the web intermediate its edges, so eliminating errors due to variations in width, known as deckle in the paper trade.

In the waveguide apparatus said main portion may be adapted to be located transversely upon a moving web of material, the displaceable part being pivotally supported in suspension upon an axis parallel to the length of said portion, so that it is able to swing away from its opposed part, preferably under resilient constraint, to permit the passage of a seam, join or the like through the division.

The waveguide may be adapted for measurement of reflected microwave energy, in which case one end will lead to a reflecting barrier, or it may be connected to input and output arms for measurement in transmission.

In the latter case, the input and output arms of the waveguide, respectively having microwave generating and detecting devices associated with them, may be disposed in various modes. For example, said two arms, which may extend from respective angularly offset connecting portions, may be straight and aligned, so that the generating and detecting devices are located on opposite sides of the web of material. Alternatively, to enable said devices to be grouped at one side of the web, and the measurement of moisture content over a more extended area of a heavy or thick web, two or four of such waveguides may be arranged in parallel disposition, transversely of the web, connected in a pair of pairs at one side, and having in an arrangement of two such pairs a changeover switch adapted to connect the output arm of the first pair to detecting means either directly or, by way of switching means, through the second pair to enable the use of two or four divided sections in series.

In another arrangement the divided main portion may be located in one limb of hairpin-form waveguide. Preferably, the output arm is the termination of the limb in which said divided portion is located and the input arm comprises the whole of the other limb and the U-bend which joins the two limbs. The divided portion may be offset on the inner side of one of the limbs of a waveguide having its U-bend in the H-plane, so that the web of material extends through the interior of the hairpin form and an end of the web has to be passed through the divided portion. Alternatively, to enable the waveguide to be brought transversely over one edge of the web of material to locate the divided main portion at an intermediate transverse portion of the web, said main portion may be located on the outer side of one of the limbs of a waveguide having its U-bend in the H-plane, or, in a waveguide having its U-bend in the E-plane, said portion may be offset from the plane of said bend and have its dividing slot parallel thereto.

A group of such hairpin-form waveguides may be combined to enable the measurement of moisture content over an extended area of a heavy or thick web of material. For example, four such waveguides having their U-bends in the H-plane may be disposed in parallel planes normal to the plane of the web, is association with detector means and changeover switches whereby utilize output and input arms may be variously connected to utilize one of the waveguides, or two or four of the waveguides in series.

Another form of waveguide according to the invention may comprise input and output arms adapted to extend transversely beneath a web of material from one side to an intermediate zone thereof, and having at their inner ends right-angle bends connecting them to opposite ends of an offset divided portion which extends in a direction parallel to the length of the web, the arrangement preferably being mounted to enable displacement of said offset portion to monitor small areas across the width of the web. In such an arrangement, the divided portion may be mounted resiliently to enable it to rock in the direction of its length, to permit the passage through the division of a seam or join in the material.

The divisions in the opposed walls of the main portion are preferably formed along the center lines of these walls, so that they will be coincident with the direction of maximum electrical field within the waveguide when microwaves are propagated therealong. This positioning in the region of maximum field gives a high sensitivity. The coupling to the source of microwave power must be such that the E-plane of the waves passing along the waveguide must be parallel to the plane across the waveguide in which the slot lies. The wall divisions are then in positions such that they will not interfere with electrical currents flowing in the walls, thus enabling normal waveguide propagation of electromagnetic energy to take place.

Various arrangements are possible for measuring the attenuation of the microwaves due to moisture in the web of material. For example, there may be associated with the waveguide or waveguides at least one generator, at least one detector, and a servo-controlled attenuator enabling a recording of moisture measurement to be made continuously, or a signal to be applied, for example, to control the amount of heat generated, in a tentering machine, or the rate at which the material is fed through the machine in order to achieve a product of constant moisture content.

When two or more waveguides are disposed in parallel disposition as aforesaid, the suspended, divided half-sections of the measurement portions may be linked together to swing jointly out of position in order to allow the passage of very heavy materials that would not normally pass through the slots. To facilitate the passage of such materials, or joints or seams in other materials, through a measurement portion disposed transversely to the direction of movement of the web a pivotally suspended displaceable part may be so formed that its wall at the entry side for the web is in the vertical plane of the pivotal axis.

The invention will now be more particularly described with reference to the accompanying drawings wherein:

FIG. 1 illustrates one form of waveguide according to the invention,

FIG. 2 is a section on the line II—II in FIG. 1,

FIG. 3 illustrates diagrammatically a pair of waveguides of an alternative form according to the invention and arranged in series, FIG. 4 shows the mounting means of the displaceable parts of the waveguides in FIG. 3, and FIGS. 5, 6 and 7 illustrate diagrammatically further waveguides arrangements according to the invention.

Referring more particularly to FIGS. 1 and 2, the waveguide is of hairpin form comprising an entry limb 2, a U-bend 4 and an exit limb 6. In this latter limb is a main measurement portion 8 of the waveguide connected by cranked portions 10 to U-bend 4 at the outlet section of the exit limb. The waveguide is divided by a slot 12 that extends through the median plane of the portion 8 and the adjoining sections of the cranked portions 10.

The lower part 14 of this slotted region is fixed but the upper part 16 is displaceable to vary the width of the slot so that a web W of material travelling through the slot and having a thickening, for example a seam, at one point will not be obstructed by the edges of the slot but will displace the upper part 16 as it passes the slot. For this purpose the part 16 depends from arms 18 that are pivoted to a bar 20 above and parallel to the plane of the slot. The axis of the bar is shown directly above the upstream edge of the waveguide but it can be located upstream of this edge so that as an obstruction travelling with the web displaces the part 16 forwards, it also moves it upwards. To hold the part 16 normally in alignment with the lower part 14 return springs 22 are connected between the arms 18 and the bar 20.

It will be appreciated that the measurement portion could lie in the upper limb of a hairpin waveguide, the U-bend then being directed downwardly from it to the lower limb and this has the advantage that a web of material can be introduced into the slot laterally from the side of the U-bend by such movement of either the web or the waveguide.

FIG. 3 illustrates another hairpin arrangement now comprising a plurality of U-bends and whereas in the previous example the U-bend 4 was in the H-plane of the waveguide each U-bend 4a now shown in the E-plane and the cranked portions 10 are so arranged that the slot 12 of the main measurement portion is parallel to and spaced from the E-plane.

The arrangement in FIG. 3 comprises in effect a plurality of waveguides disposed at spaced intervals along a web to be operated either singly or in series. For this purpose, microwave generator 30 is connected to the entry limb 2 of one waveguide and the corresponding exit limb 6 leads to a changeover device 32 whereby the transmitted energy can either be evaluated directly in a detector 36 or can be transmitted through a succeeding waveguide and then be evaluated, proceeding by way of an output arm 34 and the changeover device 32 to the detector.

In an alternative multiple arrangement of waveguides shown in FIG. 5, four hairpin waveguides 50a, 50b, 50c, 50d are provided with U-bends in their respective H-planes but with the main measurement portions 8 on the outer sides of their associated limbs. The waveguides are parallel to each other and have their slots 12 coplanar. Changeover switches 52 between the waveguides permit a single waveguide 50a to be operable between energy source 54 and detector 56 or a pair 50a, 50b to be connected in series or for all four guides 50a50b the connected in series.

The displaceable parts of the measurement portions in a multiple waveguide arrangement may each be independently movable in the manner exemplified in FIGS. 1 and 2. As an alternative, however, FIGS. 3 and 4 show a construction in which the displaceable parts 16a are rigidly interlinked by bars 60 and are suspended from stationary upper mounting members 62 by pairs of parallel pivot links 64. The parts 16a may normally be held in alignment with the lower fixed part of the waveguide portions by resilient means equivalent to the springs 22 illustrated in FIG. 2. A stop 66 is provided to locate them in such an aligned position.

In FIG. 6 there is shown schematically an arrangement in which the main measurement portion extends longitudinally of the web to measure the moisture content of a narrow intermediate region. Inlet and outlet limbs 72, 74 extend transversely to one side of the web and are joined to main measurement portion 76 by cranked portions is analogous to the example in FIG. 1 but the displaceable part now swings longitudinally and its mounting can be similar to that shown in FIGS. 3 and 4, the parallel links now being pivoted to longitudinally spaced points of the single waveguide part.

FIG. 6 shows in schematic form an adjustable mounting and a microwave circuit associated with the measurement device. These comprise a support for carriage 80 containing control equipment of the apparatus and mounting a cantilever arm 82 that is telescopically adjustable as indicated by the arrows A to locate the measurement portion of the waveguide on the web. The arm carries components of the microwave circuit in addition to the waveguide itself. The circuit comprises a microwave generator 84 coupled to one end of the waveguide, and a detector 86 such as a crystal detector coupled to the other. Part of the generated microwave energy is also passed directly to a second detector 88 by way of a waveguide branch 90 to provide a comparison signal. Controllable attenuation means may also be provided in one of the signal paths in known manner. A comparison of the signals from the two detectors can then be arranged to give a measurement of the attenuation due to moisture in the sheet and this output can be used as a process control input.

Other known circuit arrangements can be provided alternatively. In cases where the circuit is to employ a reflection measurement technique the waveguide will terminate at a back-reflecting wall and in this manner it may be possible to dispense with the second or outlet cranked limb shown in the waveguide of FIG. 1.

Thus, FIG. 7 illustrates a reflection measurement arrangement where the waveguide has an entry limb 2 leading through the cranked portion 10 to a measurement portion 8a that terminates, intermediate the width of the web W that it embraces, at a back-reflecting wall 9 perpendicular to the plane of the slot 12 and through which the slot itself continues. In the same manner as in the example of FIGS. 1 and 2, the upper part 14a of the measurement portion is displaceable to allow an obstruction to pass the slot. In the present example, the microwave generator 84 energizes the waveguide through directional coupler 92 and part of its energy is fed to detector 94. The reflected energy from the measurement section reaches a second detector 96 through the coupler 92 and the signals are evaluated in a comparison circuit 98 fed by both detectors.

What is claimed is:

1. A hollow waveguide for use in the measurement of moisture content of a moving sheet or web of material comprising, in combination: two mutually opposed channel-section waveguide portions; means mounting said portions opposite each other with a slot therebetween adapted to receive said material therethrough; a pair of connecting waveguide portions, one of said pair connected to one end of one of said channel portions, the other of said pair connected to the other end of said one of said channel portions, both of said pair of connecting portions projecting away from the plane of the slot and on the same side of said plane, the other ends of said connecting portions being adapted to be connected to a microwave source and detector, respectively; and pivoting means included in said mounting means for moving the other of said channel portions away from said one channel portion so that the width of the slot can be increased to permit passage through the slot of different thickness of material.

2. A waveguide according to claim 1 wherein a further waveguide section communicates with said other end of one of the connecting portions, said further waveguide section having its axis inclined relative to said connecting portion axis.

3. A waveguide according to claim 1 and being of rectangular cross section, wherein a further waveguide section communicates with said other end of each connecting portion, said further waveguide sections having their axes inclined relative to the axes of their associated connecting portions axes and defining input and output limbs for said channel portion, and wherein the slot is parallel to the E-plane of the waveguide, said channel portion being offset from said E-plane by the connecting portions, one of which extends into a curved path region of its associated further waveguide section whereby the waveguide is of hairpin form.

4. A waveguide according to claim 1 and being of rectangular cross section, wherein a further waveguide section communicates with said other end of each connecting portion, one of said further waveguide sections having a curved path region to give the waveguide a hairpin form, said curved path region lying in the H-plane of the waveguide.

5. A plurality of waveguides according to claim 1 wherein each waveguide includes a pair of further waveguide sections communicating with respective said other ends of the connecting portions, one of said further waveguide sections having a curved path region to give the waveguide a hairpin form, the respective channel portions of the waveguides being disposed in spaced positions with their slots coplanar and means being provided to connect the waveguides in series.

6. A plurality of waveguides according to claim 5 wherein connecting means are provided between the movable parts of the channel portions linking said parts together to move them in unison.

7. A plurality of waveguides according to claim 5 wherein energy path changeover means are provided between the channel portions whereby selected channel portions can be connected in a series arrangement for the transmission of microwave energy.

8. A waveguide according to claim 1 wherein said mounting means comprises a support, and a pivot axis for said support extending along the length of the movable channel portion and spaced from the plane of the slot.

9. A waveguide according to claim 1 wherein respective further waveguide portions communicate with the other ends of the connecting portions, each said further waveguide portion having its axis inclined relative to its associated connecting portion axis, said further waveguide portions defining input and output limbs extending over the plane of the slot transversely to said channel portion to the same side thereof whereby they can project beyond the lateral extent of a web when said channel portion is located longitudinally therealong.

10. A waveguide according to claim 9 wherein the movable channel portion is rockable in the direction of its length.

11. A waveguide according to claim 1 wherein a resilient constraint acts on the movable channel portion to urge it into registration with said other channel portion.

* * * * *